US009783346B2

(12) United States Patent
Chourreau et al.

(10) Patent No.: US 9,783,346 B2
(45) Date of Patent: Oct. 10, 2017

(54) CASE INCLUDING A VESSEL AND PIVOTING COVER

(71) Applicant: AIRBUS OPERATIONS (S.A.S.), Toulouse (FR)

(72) Inventors: Yannick Chourreau, Montberon (FR); Patrick Salgues, Toulouse (FR); Loic Challancin, Toulouse (FR); Isabelle Banel-Caule, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 65 days.

(21) Appl. No.: 14/790,943

(22) Filed: Jul. 2, 2015

(65) Prior Publication Data

US 2016/0001932 A1    Jan. 7, 2016

(30) Foreign Application Priority Data

Jul. 2, 2014   (FR) ..................................... 14 56336

(51) Int. Cl.
*B65D 43/16*  (2006.01)
*A62B 25/00*  (2006.01)
(Continued)

(52) U.S. Cl.
CPC .......... *B65D 43/166* (2013.01); *A62B 25/005* (2013.01); *B64D 11/00* (2013.01); *B65D 43/22* (2013.01); *B65D 43/24* (2013.01); *E05D 7/1011* (2013.01); *B64D 2231/025* (2013.01); *B65D 2251/1008* (2013.01); *E05D 2007/1033* (2013.01)

(58) Field of Classification Search
CPC .............. B64D 2231/025; B65D 43/24; B65D 2251/1008; E05D 1/06; E05D 7/10; E05D 7/1005; E05D 7/1011; E05D 2007/1033; E05D 7/1061; E05D 2007/128; Y10T 16/535; Y10T 16/557
USPC ................................................... 220/831, 832
See application file for complete search history.

(56) References Cited

U.S. PATENT DOCUMENTS 265,275 A * 10/1882 Olinger .................. E05C 17/18
                                                              292/265
2,453,288 A    11/1948 Walden
(Continued)

FOREIGN PATENT DOCUMENTS

DE      86 22 214      5/1988
GB       212082        3/1924

OTHER PUBLICATIONS

French Search Report dated Feb. 24, 2015, six pages.

*Primary Examiner* — Anthony Stashick
*Assistant Examiner* — Mollie Impink
(74) *Attorney, Agent, or Firm* — Nixon & Vanderhye P.C.

(57) ABSTRACT

A case including: a vessel, a cover mounted to be moved in rotation on the vessel via a hinge system which has a hinge axis and at least one hinge, wherein each hinge has a first portion which is fixedly joined to the vessel, a second portion) which is fixedly joined to the cover and a connector which assumes alternately an operating position in which the connector ensures the connection between the second portion and the first portion to allow for rotation of the second portion relative to the first portion about the hinge axis and, alternatively, a safety position in which the connector dissociates the second portion and the first portion.

18 Claims, 4 Drawing Sheets

(51) Int. Cl.
*B65D 43/24* (2006.01)
*B65D 43/22* (2006.01)
*E05D 7/10* (2006.01)
*B64D 11/00* (2006.01)

(56) References Cited

U.S. PATENT DOCUMENTS

| | | | | |
|---|---|---|---|---|
| 2,707,064 | A * | 4/1955 | Castello | E05C 17/38 |
| | | | | 16/335 |
| 5,940,934 | A * | 8/1999 | Turner | E05D 7/1011 |
| | | | | 16/257 |
| 6,860,387 | B2 * | 3/2005 | Chang | B65D 43/24 |
| | | | | 16/295 |
| 9,273,500 | B2 * | 3/2016 | Fan | E05C 17/085 |
| 2002/0130128 | A1 | 9/2002 | Berglund | |
| 2009/0165813 | A1 | 7/2009 | Sekine | |

\* cited by examiner

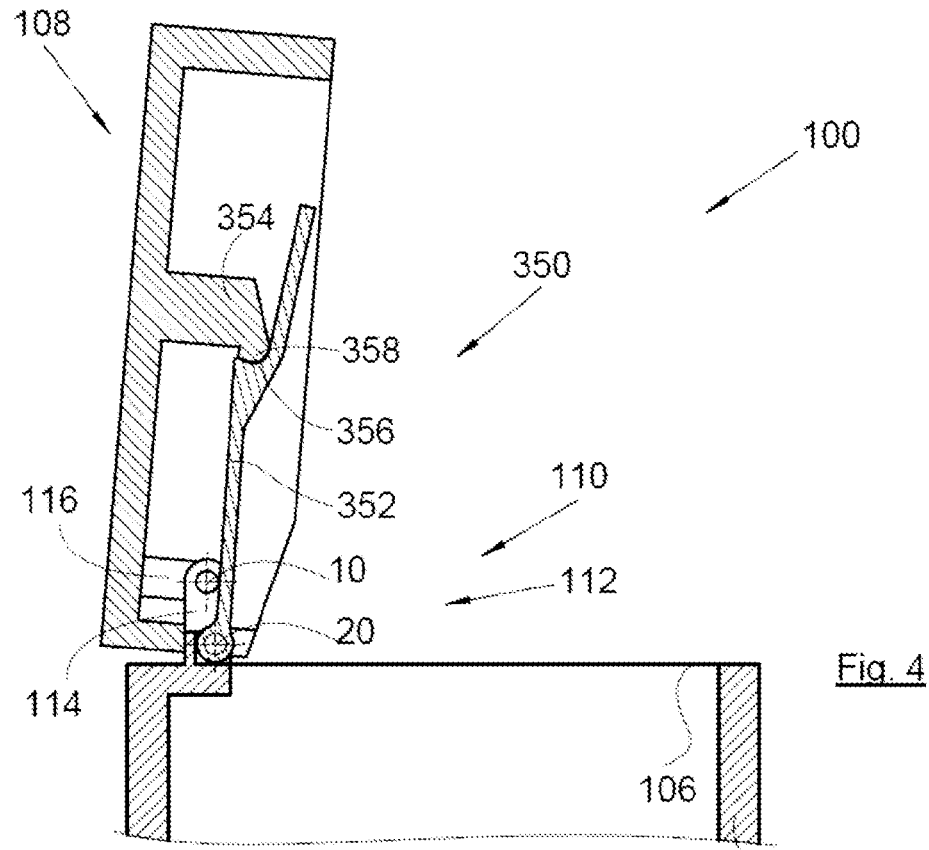
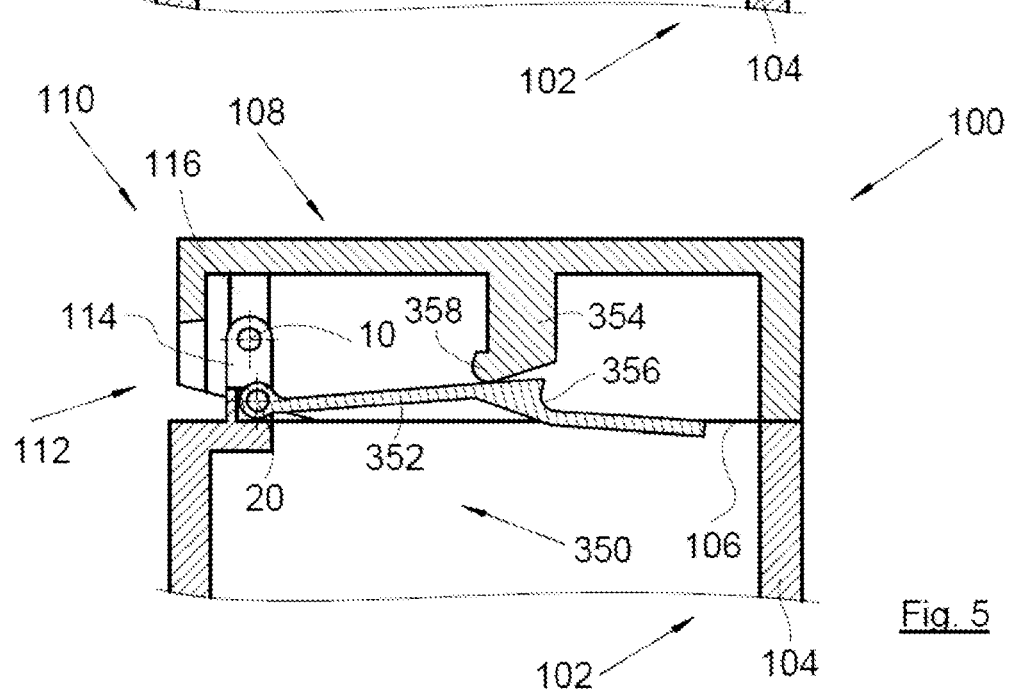

CASE INCLUDING A VESSEL AND PIVOTING COVER

RELATED APPLICATION

This application claims priority to French patent application 1456336 filed Jul. 2, 2014, the entirety of which is incorporated by reference.

FIELD OF INVENTION

The present invention relates to a case which comprises a vessel and a cover which pivots on the vessel.

BACKGROUND

A case may include a vessel which has a base, an opening opposite the base and lateral walls which delimit the inner volume of the vessel. Objects may be placed in the inner volume through the opening.

To ensure the protection of the objects in the inner volume, the case conventionally comprises a cover which is pivotably mounted on the vessel and which can be moved between an open position in which the opening is not closed by the cover and a closed position in which the opening is closed by the cover. A case may be used in an aircraft cockpit to enclose oxygen masks which are available for personnel in the cockpit. During maintenance of the aircraft, a technician in the cockpit may step on the cover of the case. Thus, the case should be able to support without deformation heavy loads, such due to a person standing on the case. Conventional covers for cases are typically rigid and heavy to withstand heavy loads.

SUMMARY OF INVENTION

An invention has been conceived and is disclosed herein to provide a case which comprises a vessel and a cover which has a light cover that does not deformed under a load. The case may comprise:
 a. a vessel,
 b. a cover which is mounted so as to be able to be moved in rotation on the vessel via a hinge system which has a hinge axis and which comprises at least one hinge,
 c. the hinge system includes hinges which have a first portion fixedly joined to the vessel, a second portion fixedly joined to the cover, and
 d. a connector provided to assume alternately an operating position in which the connection means ensure, on the one hand, the connection between the second portion and the first portion and, on the other hand, the rotation of the second portion relative to the first portion about the hinge axis or a safety position in which the connector ensures the dissociation of the second portion and the first portion. If an excessively heavy load is applied to the cover, the connection means allow the cover to become detached from the vessel. The cover of the case may be less rigid and thus less heavy than conventional cases.

Advantageously, the movement from the operating position to the safety position is carried out when there is applied to the cover a force which has a component perpendicular to the hinge axis and whose intensity is greater than a threshold intensity.

Advantageously, the connector may include a spring-loaded ball type stop.

Advantageously, the case further comprises a retainer provided to alternately assume a retention position in which they retain the cover in an open position and a released position in which they do not maintain the cover in an open position which thus allows it to return to a closed position.

According to a specific embodiment of the case, the retainer includes at least one magnet and, for each magnet, a metal element, one from the cover or the vessel comprises at least one magnet and the other from the vessel or the cover comprises, for each magnet, a metal element, and each magnet and the associated metal element move into contact when the cover is in an open position.

According to another specific embodiment of the case, the retainer may comprise:
 a. a block which has a counterpart and which is fixedly joined to the cover, and
 b. a lever which has a cavity, the lever being mounted so as to be movable in rotation on the vessel about a rotation axis parallel with the hinge axis and remote therefrom, between a non-engagement position in which the cavity and the counterpart do not cooperate in order to retain the cover in an open position and an engagement position in which the cavity and the counterpart cooperate in order to retain the cover in an open position, and
 c. a return means which urges the lever into contact against the block.

According to another specific embodiment, the retainer may comprise:
 a. a leaf spring which has an end which is fixedly joined to the cover and a free end,
 b. a rod which is mounted so as to be movable in rotation on the vessel about a rotation axis parallel with the hinge axis and remote therefrom, which has a retention portion which is parallel with the rotation axis and which is placed between the leaf spring and the cover,
 wherein the leaf spring has a fold which is such that, on the one hand, the distance between the fold and the cover is less than the cross-section of the retention portion and, on the other hand, the retention portion is at one side of the fold when the cover is closed and the other side of the fold when the cover is open.

Advantageously, the case may also comprise a shield which covers the leaf spring and the retention portion.

SUMMARY OF THE DRAWINGS

The features of the invention mentioned above, and others, will be appreciated more clearly from a reading of the following description of an embodiment, the description being given in relation to the appended drawings, in which:

FIG. 4 shows a variant of the case of FIG. 1 in section along the line IV-IV, when the cover is in an open position, FIG. 5 shows the case of FIG. 4, when the cover is in a closed position.

DETAILED DESCRIPTION

Figure 1:
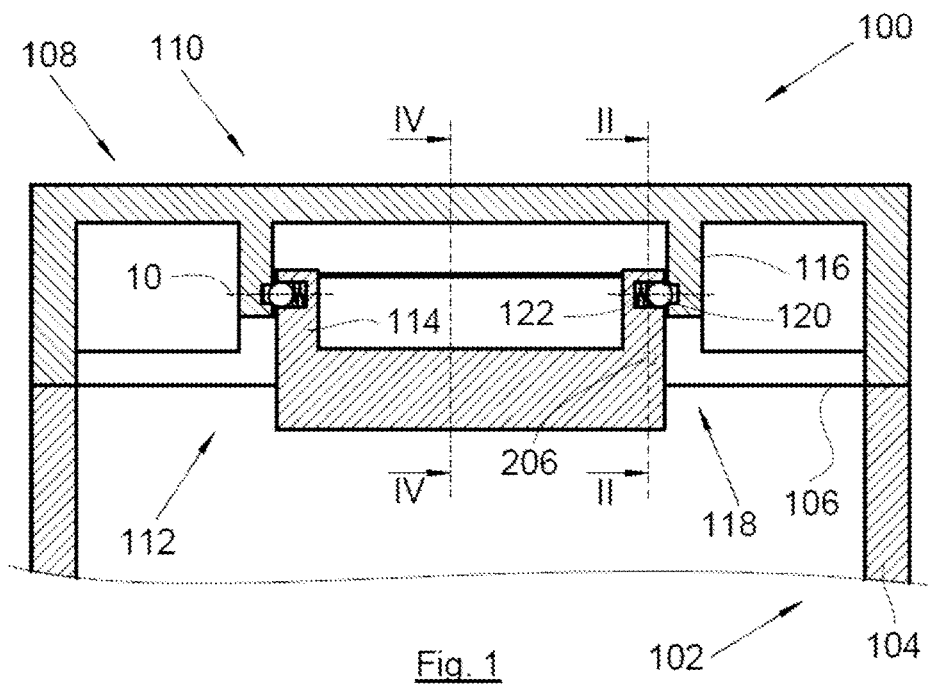
FIG. 1 shows a case according to the invention in section along the line I-I of FIG. 2.

FIG. 1 shows a case 100 which comprises a vessel 102 and a cover 108. The vessel 102 has a base, lateral walls 104 delimiting the inner space of the case 100 and an opening 106 which faces the base. The case 100 may be positioned in an aircraft cockpit to accommodate therein an oxygen mask for a pilot. The cover 108 is mounted so as to be able to be moved in rotation on the vessel 102 via a hinge system 110 between an open position in which the opening 106 is not closed by the cover 108 and a closed position in which the opening 106 is closed by the cover 108.

Figure 2:
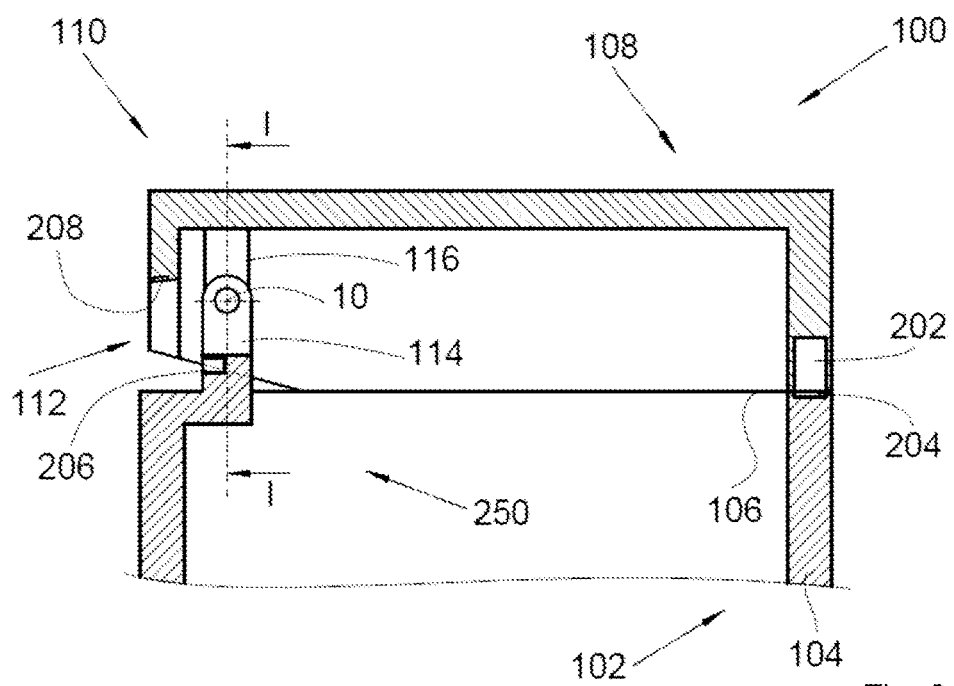
FIG. 2 shows the case of FIG. 1 in section along the line II-II, when the cover is in a closed position.
Figure 3:
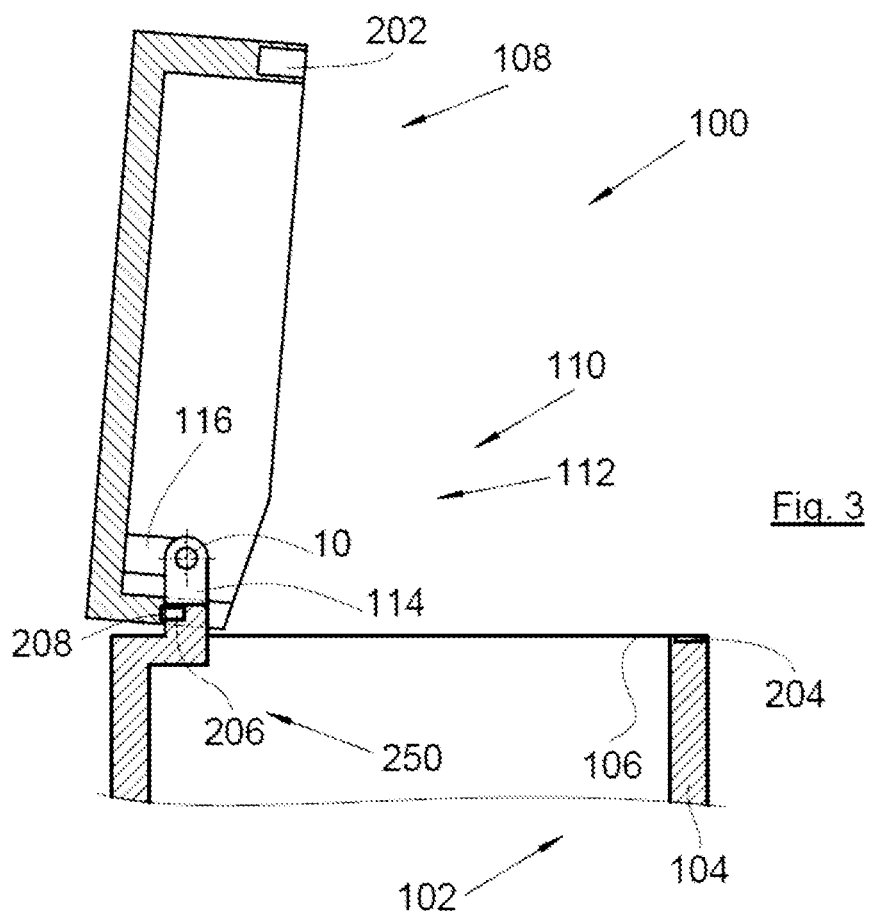
FIG. 3 shows the case of FIG. 2, when the cover is in an open position.

FIG. 2 shows the case 100 when the cover 108 is in the closed position and FIG. 3 shows the case 100 when the cover 108 is in the open position.

The hinge system 110 comprises in this instance two hinges 112 but it could have at least one. The hinge system 110 has a hinge axis 10 which is common to each hinge 112 which constitutes it.

Each hinge 112 has a first portion 114 which is fixedly joined to the vessel 102 and a second portion 116 which is fixedly joined to the cover 108.

Each hinge 112 also has connection means 118, e.g. a connector, which are provided to alternately assume an operating position in which the connection means 118 ensure, on the one hand, the connection between the second portion 116 and the first portion 114 and, on the other hand, the rotation of the second portion 116 relative to the first portion 114 about the hinge axis 10, or a safety position in which the connection means 118 ensure the dissociation of the second portion 116 and the first portion 114.

In this manner, when the connection means 118 are in an operating position, the cover 108 can move from the open position to the closed position and vice versa by means of rotation about the hinge axis 10 and, when the connection means 118 are in a safety position, the cover 108 becomes dissociated from the vessel 102.

The connection means 118 are such that the dissociation of the second portion 116 and the first portion 114 is reversible, that is to say that the movement into the safety position is not destructive and they can be placed in the operating position again.

The movement from the operating position to the safety position is carried out when there is applied to the cover 108 a force which has a component perpendicular to the hinge axis 10 and whose intensity is greater than a threshold intensity.

That is to say that, if a technician climbs on the cover 108 and the intensity of the component perpendicular to the hinge axis 10 which he applies to the cover is greater than the threshold intensity, the connection means 118 will be placed in the safety position and the cover 108 will become separated from the vessel 102. The cover 108 will then move relative to the vessel 102, forcing the technician to climb down.

The threshold intensity is determined in accordance with the force which the cover 108 can support without becoming damaged.

In the embodiment of the invention which is set out in this instance, the connection means 118 are in the form of a spring-loaded ball type stop which is illustrated schematically here by a spring 122 and a ball 120 which is biased by the spring. The axis of the spring-loaded ball type stop 118 is aligned with the hinge axis 10.

The first portion 114 has a first bore which is coaxial with the hinge axis 10 and the second portion 116 has a second bore which is coaxial with the hinge axis 10. The two bores open opposite each other.

The spring-loaded ball type stop 118 is arranged in this instance in the bore of the first portion 114 but it may be arranged in the bore of the second portion 116.

In an operating position, the ball 120 projects from the bore in which the spring-loaded ball type stop 118 is accommodated and is accommodated partially in the other bore in abutment against the edges of the other bore in order to ensure the retention of the cover 108 in the vessel 102 and the rotation of the cover 108 on the vessel 102.

When a force is applied to the cover 108, this force tends to move the cover 108 and therefore the edges of the bore of the portion (in this instance the second portion 116) in which the spring-loaded ball type stop 118 is not accommodated. These edges then press on the ball 120 and cause it to return into the bore of the portion (in this instance the first portion 114) in which the spring-loaded ball type stop 118 is accommodated. In this manner, the ball 120 retracts and the cover 108 becomes separated from the vessel 102.

In order to ensure the closed position of the cover 108, one from the cover 108 or the vessel 102 comprises at least one magnet 202 and the other from the vessel 102 or the cover 108 comprises, for each magnet 202, a metal element 204. The magnet 202 and the metal element 204 which are associated move into contact when the cover 108 is in the closed position.

In order to ensure the open position of the cover 108, the case 100 comprises retention means 250, e.g., a retainer, which are provided in order to alternately assume a retention position in which they retain the cover 108 in an open position and a released position in which they do not retain the cover 108 in an open position which thus allows it to return to a closed position. The retention means 250 thus prevents the cover 108 from falling onto the hand of a person who has opened the cover 108. In this manner, when a person, in particular an aircraft pilot, wishes to take the contents of the case 100, he can open and take the contents of the case 100 with one hand.

In FIGS. 2 and 3, the retention means 250 comprise at least one magnet 206 and, for each magnet 206, a metal element 208 and one from the cover 108 or the vessel 102 comprises at least one magnet 206 and the other from the vessel 102 or the cover 108 comprises, for each magnet 206, a metal element 208. Each magnet 206 and the associated metal element 208 move into contact when the cover 108 is in the open position. In the embodiment set out here, the magnet 206 is integrated in the first portion 114 and the metal element 208 is integrated in the cover 108.

FIGS. 4 and 5 show retention means 350 according to another embodiment. The retention means 350 comprise a lever 352 which has a cavity 356 (in this instance a female cavity) and a block 354 which has a counterpart 358 (in this instance a male counterpart) and is fixedly joined to the cover 108. The counterpart 358 may be a detent in a fixed position on the cover and positioned to engage counterpart 358, e.g., a ridge, on the lever 352.

The lever 352 is mounted so as to be able to be moved in rotation on the vessel 102 about a rotation axis 20 which is parallel with the hinge axis 10 and remote therefrom. The rotation axis 20 is arranged in this instance between the base of the vessel 102 and the hinge axis 10. The differentiation between the rotation axis 20 and the hinge axis 10 enables an intersection zone to be created between the two rotation movements of the cavity 356 and the counterpart 358.

The lever 352 can be moved between a non-engagement position and an engagement position. In the non-engagement position, the cavity 356 and the counterpart 358 do not cooperate which results in the cover 108 not being retained in an open position. In the engagement position, the cavity 356 and the counterpart 358 cooperate which results in the cover 108 being retained in an open position.

The engagement position corresponds to the open position of the cover 108 and the non-engagement position corresponds to all the positions of the cover 108 apart from the open position.

A return means forces the lever 352 into contact against the cover 108 and in particular against the block 354 whether this be in the engagement position or in the non-engagement position. The return means is, for example, a torsion spring which is mounted in the region of the rotation axis 20.

The operation is as follows:

a. When a person opens the cover 108, the lever 352, which is urged by the return means, follows the cover 108 and pivots about the rotation axis 20.

b. When the cover 108 and the lever 352 reach the engagement position, the cavity 356 and the counterpart 358 engage one in the other in order to ensure the open position of the cover 108.

c. In order to close the cover again, it is simply necessary to use one hand to move the lever 352 away and to lower the cover 108.

d. The return means allows the cover 108 to be followed automatically by the lever 352 without the user having to intervene, thereby avoiding any need for both hands in order to open and engage the cavity 356 and the counterpart 358.

Figure 8:
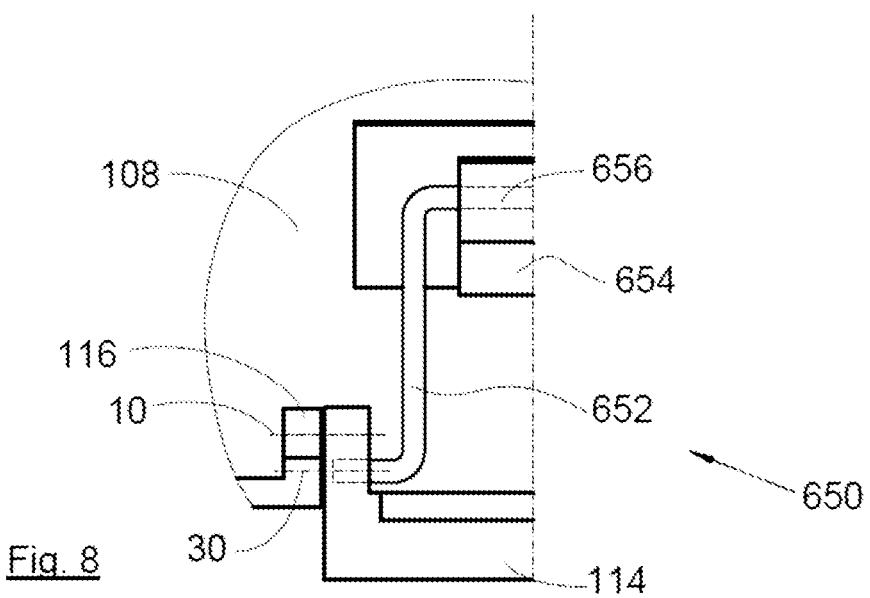
FIG. 8 is a view in accordance with the arrow VIII of FIG. 6.
Figure 6:
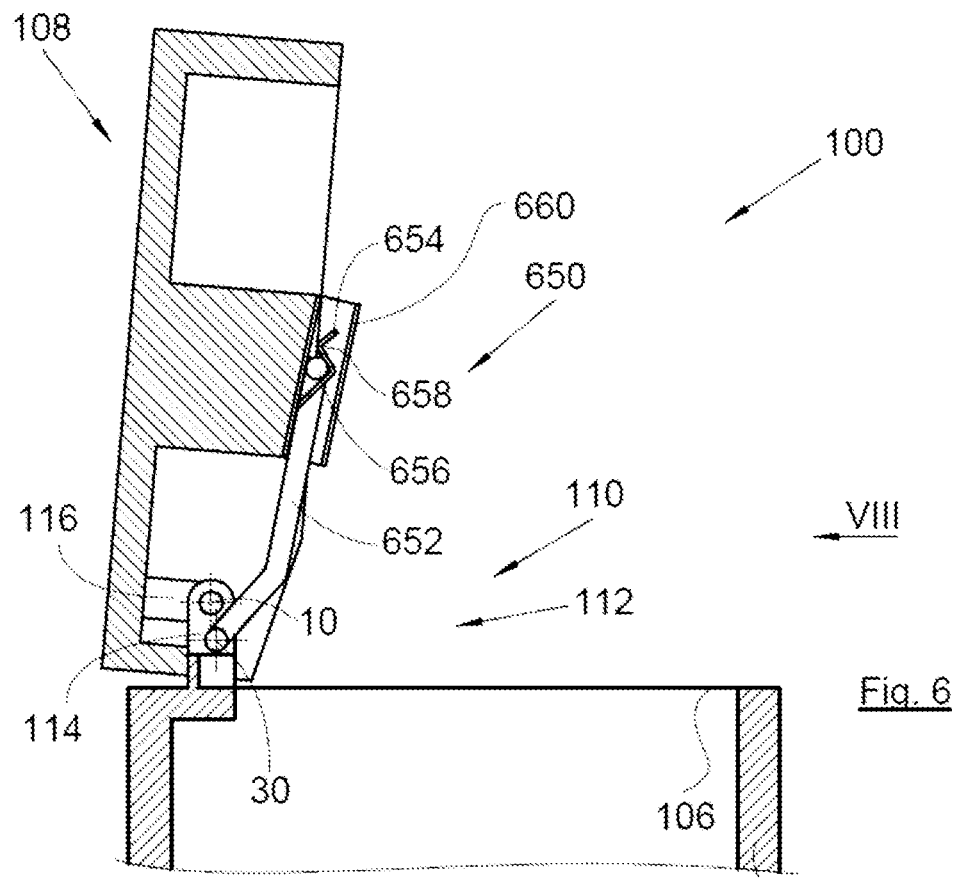
FIG. 6 shows a variant of the case of FIG. 1 in section along the line IV-IV, when the cover is in an open position.
Figure 7:
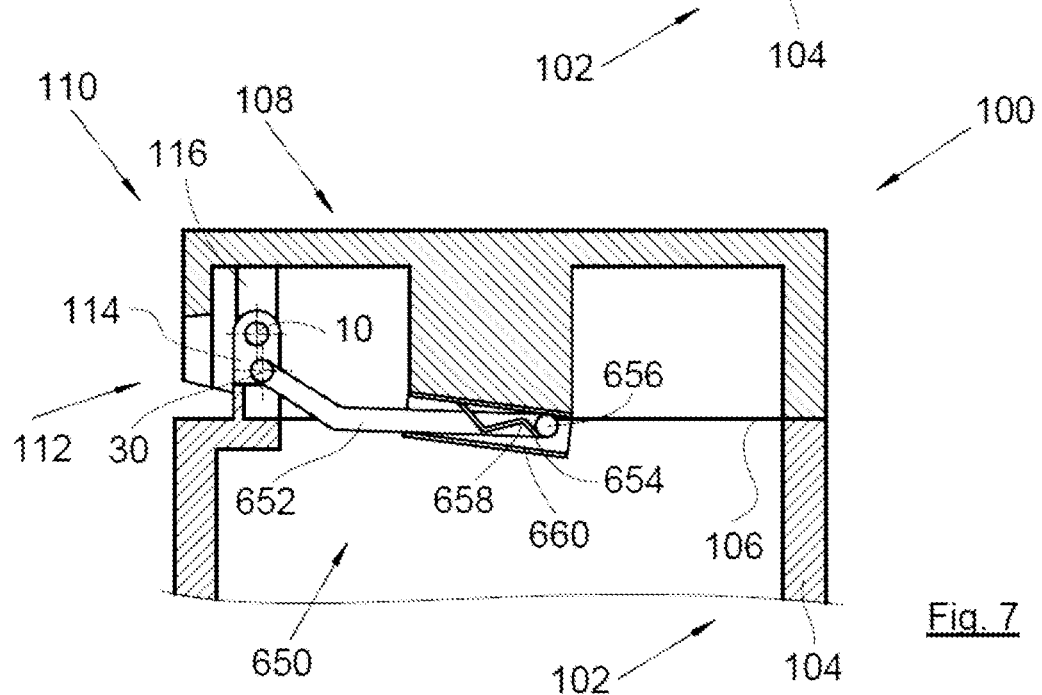
FIG. 7 shows the case of FIG. 6, when the cover is in a closed position.

FIGS. 6, 7 and 8 show retention means 650 according to another embodiment. The retention means 650 comprises a rod 652 and a leaf spring 654 which has one end which is fixedly joined to the cover 108 and a free end.

The rod 652 is mounted so as to be movable in rotation on the vessel 102 about a rotation axis 30 which is parallel with the hinge axis 10 and which is remote therefrom. The rotation axis 30 is arranged in this instance between the base of the vessel 102 and the hinge axis 10.

The rod 652 has a retention portion 656 which is parallel with the rotation axis 30 and which is placed between the leaf spring 654 and the cover 108.

The leaf spring 654 has a fold 658 which is such that, on the one hand, the distance between the fold 658 and the cover 108 is less than the cross-section of the retention portion 656 and, on the other hand, the retention portion 656 is at one side of the fold 658 when the cover is closed (FIG. 7) and at the other side of the fold 658 when the cover is open (FIGS. 6 and 8). In the last case, the fold 658 and the retention portion 656 cooperate in order to keep the cover 108 open.

The operation is as follows:

a. When a person opens the cover 108 with one hand, the retention portion 656 is located between the leaf spring 654 and the cover 108 and is therefore driven in rotation about the rotation axis 30.

b. When the cover 108 reaches an intermediate position between the closed position and the open position, the retention portion 656 reaches the fold 658 and moves it progressively away from the cover 108 in order to pass beyond it.

c. The retention portion 656 is then located at the other side of the fold 658 and maintains the open position of the cover 108.

d. In order to close the cover again, it is simply necessary to use one hand to push down on the cover 108 so that the retention portion 656 passes between the fold 658 and the cover 108 in order to return to its initial position.

The rod 652 in this instance is in the form of an Omega (Ω) whose two ends are inserted into bores of the vessel 102 provided for this purpose and produce the pivot connection about the rotation axis 30 and whose central portion constitutes the retention portion 656.

A shield 660 may cover the leaf spring 654 and the retention portion 656 in order to improve the visual appearance of the assembly and to prevent the leaf spring 654 from striking and potentially damaging the objects present in the case 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

We claim:

1. A case comprising:
   a vessel including sidewalls and a bottom wall defining an interior volume;
   a cover mounted via a hinge system to an upper portion of the vessel, wherein the cover has a first operating position in which the cover covers the upper portion of the vessel and forms a top wall to the interior volume, a second operating position in which the cover exposes the upper portion and the interior volume of the vessel, and a third position in which the cover is disassociated from the hinge system;
   the hinge system includes a first hinge and a second hinge having a common axis with the first hinge, wherein the cover pivots about the common axis while moving from the first operating position to the second operating position;
   the first hinge and second hinge each include a ball and a spring aligned with the common axis, wherein each ball is biased by the spring to be positioned in an interface between the cover and the vessel while the cover is in the first and second operating positions, and the ball is displaced from the interface while the cover is in the third position; and
   a retention device configured to retain the cover in the second operating position, wherein the first and second hinges are disposed above the upper edge of the sidewalls and directly above the interior volume defined by the sidewalls when the cover covers the upper portion of the vessel.

2. The case of claim 1 wherein the interface is between a surface of the vessel and a surface of the cover, and each of the surfaces includes a recesses configured to receive the ball, wherein the recesses are aligned with the common axis.

3. The case of claim 1 wherein the retention device includes a first magnetic element on the upper portion and a second magnetic portion on a lower portion of the cover, wherein the first and second magnetic portions are adjacent each other while the cover is in the second operating position.

4. The case of claim 1 wherein the retention device is an arm pivotably attached at one end to the vessel and including a finger towards an opposite end of the arm, wherein the finger seats in a recess on the cover while the cover is in the second operating position.

5. The case of claim 1 wherein the vessel is configured to receive an oxygen mask and the vessel is configured to be located in a cockpit of an aircraft.

6. The case of claim 1 wherein each of the first and second hinges has a first recess portion fixedly joined to the vessel, a second recess portion fixedly joined to the cover and the ball seats in both the first and second recess while the ball is at the interface.

7. The case of claim 1 wherein the cover pivots about the first and second hinges and the common axis.

8. The case of claim 1 wherein the displacement of the ball is in response to a force applied to the cover, wherein the force has a component normal to a top surface of the cover and the component is greater than a threshold intensity.

9. The case of claim 1 wherein the retention device comprises:
   a leaf spring which has an end which is fixedly joined to the cover and a free end,
   a rod pivotably mounted to the vessel wherein the rod has a retention portion parallel to the common axis and between the leaf spring and the cover,
   the leaf spring having a fold, wherein a distance between the fold and the cover is less than a cross-section of the retention portion and the retention portion is at one side of the fold when the cover is in the first operational position and at the other side of the fold when the cover is in the second operational position.

10. The case of claim 9 further comprising a shield covering the leaf spring and the retention portion.

11. A case comprising:
   a vessel including sidewalls and a bottom wall defining an interior volume;
   a cover mounted via a hinge system to an upper portion of the vessel, wherein the cover has a first operating position in which the cover covers the upper portion of the vessel and forms a top wall to the interior volume, a second operating position in which the cover exposes the upper portion and the interior volume of the vessel, and a third position in which the cover is disassociated from the hinge system;
   the hinge system includes a first hinge and a second hinge having a common axis with the first hinge, wherein the cover pivots about the common axis while moving from the first operating position to the second operating position;
   the first hinge and second hinge each include a ball and a spring aligned with the common axis, wherein each ball is biased by the spring to be positioned in an interface between the cover and the vessel while the cover is in the first and second operating positions, and the ball is displaced from the interface while the cover is in the third position; and
   a retention device configured to retain the cover in the second operating position and comprising:
   a block which has a counterpart and which is fixedly joined to the cover,
   a lever which has a cavity, the lever being mounted so as to be movable in rotation on the vessel about a rotation axis parallel with the hinge axis and remote therefrom, between a non-engagement position in which the cavity and the counterpart do not cooperate to retain the cover in an open position and an engagement position in which the cavity and the counterpart cooperate in order to retain the cover in an open position, and
   a return spring which urges the lever into contact against the block.

12. A case comprising:
   a vessel including sidewalls and a bottom wall defining an interior volume, and an upper rim at ends of the sidewalls opposite to the bottom wall, wherein the upper rim defines a perimeter of the interior volume;
   posts fixed to the vessel and extending beyond the upper rim, wherein the posts each have a surface with a recess and the recess are aligned with a common axis;
   a cover with a lower edge configured to seat on the upper rim of the vessel and a ridge configured to fit between the posts of the vessel, wherein a surface on each of the posts is opposite to a corresponding surface on opposite sides of the ridge;
   a common axis extending through the posts and the ridge, wherein the recesses on each of the surfaces of the posts and recesses on the surfaces of the ridge are aligned with the common axis;
   a first ball seated in one of the recesses of the surface of the post and one of the recesses of the ridge, and a second ball seated in the other recess of the surface of the post and the other recess of the ridge, wherein each of the balls is biased to bridge a respective gap between one of the posts and the ridge, and the balls form a hinge about which the cover pivots about the common axis with respect to the vessel, and the balls are displaced from the gaps by a force applied to an upper surface of the cover and causing a portion of the cover facing the vessel to be displaced towards the vessel in the direction of the force applied to the upper surface of the cover.

13. The case of claim 12 further comprising a retention device configured to retain the cover to expose interior volume of the vessel, and retention device comprising:
   a block which has a counterpart and which is fixedly joined to the cover,
   a lever which has a cavity, the lever being mounted so as to be movable in rotation on the vessel about a rotation axis parallel with the common axis and remote therefrom, between a non-engagement position in which the cavity and the counterpart do not cooperate to retain the cover in an open position and an engagement position in which the cavity and the counterpart cooperate in order to retain the cover in an open position, and
   a return spring which urges the lever into contact against the block.

14. The case of claim 12 wherein the posts are disposed above the interior volume defined by the sidewalls.

15. A case comprising:
   a vessel including sidewalls and a bottom wall defining an interior volume;
   a cover mounted via a hinge system to an upper portion of the vessel, wherein the cover has a first operating position in which the cover covers the upper portion of the vessel and forms a top wall to the interior volume, and a second operating position in which the cover exposes the upper portion and the interior volume of the vessel;
   the hinge system includes a first hinge and a second hinge having a common axis with the first hinge, wherein the cover pivots about the common axis while moving from the first operating position to the second operating position; and
   a retention device configured to retain the cover in the second operating position, the retention device comprising:
   a block fixedly joined to the cover and including a counterpart, a lever including a cavity, the lever being mounted so as to be movable in rotation on the vessel about a rotation axis parallel with the common axis and remote therefrom, between a non-engagement position in which the cavity and the counterpart do not cooperate to retain the cover in an open position and an engagement position in which the cavity and the counterpart cooperate in order to retain the cover in an open position, and a return spring configured to urge the lever into contact against the block.

16. The case of claim 15 wherein the first hinge and second hinge each include a ball and a spring aligned with the common axis, wherein each ball is biased by the spring to be positioned in an interface between the cover and the vessel while the cover is in the first and second operating positions.

17. The case of claim 15 wherein the first hinge and the second hinge are disposed between the interior volume of the vessel and the top wall formed by the cover, when the cover is in the first operating position.

18. The case of claim 15 wherein the first hinge and the second hinge are disposed directly above the interior volume defined by the sidewalls when the cover is in the first operating position.

\* \* \* \* \*